US012749133B2

(12) United States Patent
Matsuda et al.

(10) Patent No.: US 12,749,133 B2
(45) Date of Patent: Sep. 29, 2026

(54) ACCOMMODATION MANAGEMENT SYSTEM AND ACCOMMODATION MANAGEMENT APPARATUS

(71) Applicant: NEC Corporation, Tokyo (JP)

(72) Inventors: Akira Matsuda, Tokyo (JP); Yusuke Miyamoto, Tokyo (JP); Takashi Ueno, Tokyo (JP); Saki Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/384,057

(22) Filed: Oct. 26, 2023

(65) Prior Publication Data

US 2024/0054584 A1 Feb. 15, 2024

Related U.S. Application Data

(63) Continuation of application No. 17/081,403, filed on Oct. 27, 2020, now abandoned.

(30) Foreign Application Priority Data

Oct. 28, 2019 (JP) ................................ 2019-195194

(51) Int. Cl.
*G06Q 50/14* (2012.01)
*G06Q 10/02* (2012.01)
(Continued)

(52) U.S. Cl.
CPC ............. *G06Q 50/14* (2013.01); *G06Q 10/02* (2013.01); *G06Q 10/10* (2013.01); (Continued)

(58) Field of Classification Search
CPC ......... G06Q 50/14; G06Q 10/14; G06Q 10/10
(Continued)

(56) References Cited

U.S. PATENT DOCUMENTS 10,936,854 B2 * 3/2021 Licht ...................... G06V 40/16
2018/0373925 A1 12/2018 Wang et al.
(Continued)

FOREIGN PATENT DOCUMENTS

CA 3040971 A1 * 4/2018 ............. G06V 40/40
CN 107146171 A 9/2017
(Continued)

OTHER PUBLICATIONS

US Office Action for U.S. Appl. No. 17/081,403, mailed on May 8, 2024.

(Continued)

*Primary Examiner* — Akiba K Robinson
(74) *Attorney, Agent, or Firm* — Sughrue Mion, PLLC

(57) ABSTRACT

An accommodation management system includes: a first acquisition unit that obtains a face image of a visiting user who uses a check-in terminal installed at a visible position from a reception counter of an accommodation facility; an execution unit that identifies the visiting user on the basis of the face image of the visiting user and performs a check-in process of the visiting user; a second acquisition unit that obtains a face image of a specific user who uses services; and a permission unit that permits a use of the services when the check-in process is completed for the specific user who is identified on the basis of the face image of the specific user.

8 Claims, 8 Drawing Sheets

(51) Int. Cl.
*G06Q 10/10* (2023.01)
*G06Q 30/018* (2023.01)
*G06V 40/16* (2022.01)
*G07C 9/00* (2020.01)
*G07C 9/29* (2020.01)

(52) U.S. Cl.
CPC ....... *G06Q 30/0185* (2013.01); *G06V 40/166* (2022.01); *G06V 40/172* (2022.01); *G07C 9/00563* (2013.01); *G07C 9/29* (2020.01)

(58) Field of Classification Search
USPC ..................................................... 705/5, 7.11
See application file for complete search history.

(56) References Cited

U.S. PATENT DOCUMENTS

| | | | | |
|---|---|---|---|---|
| 2020/0372743 | A1* | 11/2020 | Miller | G07C 9/257 |
| 2022/0414195 | A1* | 12/2022 | Sakaguchi | G06Q 50/40 |

FOREIGN PATENT DOCUMENTS

| | | | | | |
|---|---|---|---|---|---|
| CN | 107194835 | A | | 9/2017 | |
| CN | 107341940 | A | * | 11/2017 | G08B 13/02 |
| CN | 107967453 | A | | 4/2018 | |
| CN | 109147104 | A | | 1/2019 | |
| CN | 109829370 | A | | 5/2019 | |
| CN | 109902463 | A | | 6/2019 | |
| CN | 110335377 | A | | 10/2019 | |
| CN | 110443923 | A | * | 11/2019 | G06K 9/00255 |
| CN | 111919233 | A | | 11/2020 | |
| EP | 3418912 | A1 | | 12/2018 | |
| IN | 201502599-13 | | * | 7/2015 | |
| JP | 2003-256583 | A | | 9/2003 | |
| JP | 2004-353226 | A | | 12/2004 | |
| JP | 2004362283 | A | * | 12/2004 | |
| JP | 2005-158007 | A | | 6/2005 | |
| JP | 2006-215858 | A | | 8/2006 | |
| JP | 4521086 | B2 | | 8/2010 | |
| JP | 4528262 | B2 | | 8/2010 | |
| JP | 2011-048817 | A | | 3/2011 | |
| JP | 4923282 | B2 | | 4/2012 | |
| JP | 2013-054588 | A | * | 3/2013 | |
| JP | 2014-106842 | A | | 6/2014 | |
| JP | 2016-126414 | A | | 7/2016 | |
| JP | 6163239 | B1 | | 7/2017 | |
| JP | 2017182326 | A | * | 10/2017 | |
| JP | 2018-101235 | A | | 6/2018 | |
| JP | 2019046124 | A | * | 3/2019 | |
| JP | WO2019/065491 | A1 | | 5/2020 | |
| JP | 2020-524850 | A | | 8/2020 | |
| JP | 6889023 | B2 | | 6/2021 | |
| KR | 102148699 | B1 | | 8/2020 | |
| UA | 128367 | C2 | | 6/2024 | |
| WO | 2006/030410 | A2 | | 3/2006 | |
| WO | 2018/048352 | A1 | | 3/2018 | |
| WO | 2018/180588 | A1 | | 10/2018 | |
| WO | 2019/006503 | A1 | | 1/2019 | |
| WO | 2020/053953 | A1 | | 3/2020 | |
| WO | 2021/034309 | A1 | | 2/2021 | |

OTHER PUBLICATIONS

JP Official Communication for Japanese Patent Application No. 2023-091073, mailed on Apr. 2, 2024 with English Translation.
JP Office Action for JP Application No. 2019-195194, mailed on Oct. 4, 2022 with English Translation.
Japanese Office Action for JP Application No. 2019-195194, mailed on Jan. 24, 2023 with English Translation.
JP Office Action for JP Application No. 2024-072790, mailed on Jan. 14, 2025 with English Translation.
US Office Action for U.S. Appl. No. 18/240,479, mailed on Jun. 4, 2025.
"Hospitality in the Image of Small Family Accommodation Businesses." Innovative marketing (2019): n. pag. Web. (Year: 2019).
US Office Action for U.S. Appl. No. 18/384,517, mailed on Jun. 11, 2025.
US Office Action for U.S. Appl. No. 18/240,479, mailed on Dec. 1, 2025.
US Office Action for U.S. Appl. No. 19/264,076, mailed on Jan. 5, 2026.
US Office Action for U.S. Appl. No. 18/384,517, mailed on Dec. 18, 2025.
US Office Action for U.S. Appl. No. 18/824,187, mailed on May 4, 2026.
US Office Action for U.S. Appl. No. 19/279,260, mailed on Jul. 14, 2026.
US Office Action for U.S. Appl. No. 19/279,189, mailed on Jun. 26, 2026.

* cited by examiner

ACCOMMODATION MANAGEMENT SYSTEM AND ACCOMMODATION MANAGEMENT APPARATUS

INCORPORATION BY REFERENCE

This application is a Continuation of U.S. application Ser. No. 17/081,403, filed on Oct. 27, 2020, which is based upon and claims the benefit of priority from the prior Japanese Patent Application No. 2019-195194, filed on Oct. 28, 2019, the disclosure of which is incorporated herein in its entirety by reference.

TECHNICAL FIELD

Embodiments of the present disclosure relate to an accommodation management system, an accommodation management method, and a non-transitory program recording medium that are allowed to manage the facility use of a user.

BACKGROUND ART

For such a system, there is known a system that performs a check-in process by using a face image of a user. For example, Japanese Patent Application Laid Open No. 2018-101235 discloses a technology/technique for confirming whether a guest who is in an accommodation facility is a person who has reserved the accommodation by collating the person's image distributed from a mobile terminal with a face included in an image of his or her identification card. Japanese Patent Application Laid Open No. 2017-182326 discloses a technology/technique in which a qualification information is registered in association with a face image at the time of check-in at a hotel, and the use of the facility is permitted when a captured face image is coincident with a registered face image.

In addition, Japanese Patent No. 4528262 discloses that an authentication process using face images at an airport can be used for security check at a hotel entrance. Japanese Patent Application Laid Open No. 2013-054588 discloses that a face image of a user is obtained when the user checks in an accommodation facility.

In accommodation facilities, it is conceivable to use face authentication for a plurality of authentication processes (e.g., a check-in process, a process of permitting an entry to a guest room, etc.). It is, however, not easy to apply the face authentication to each of such individual processes. Specifically, each of the plurality of authentication processes requires different authentication conditions, and this may complicate the processes that are performed by the system.

In the patent literatures described above, however, such authentication processes are not considered.

SUMMARY

In view of the problems described above, it is therefore an example object of the present disclosure to provide an accommodation management system and an accommodation management method that are allowed to appropriately manage a user's check-in at accommodations and service use.

An accommodation management system according to an example aspect of the present disclosure includes: a first acquisition unit that obtains a face image of a visiting user who uses a check-in terminal installed at a visible position from a reception counter of an accommodation facility; an execution unit that identifies the visiting user on the basis of the face image of the visiting user and performs a check-in process of the visiting user; a second acquisition unit that obtains a face image of a specific user who uses services; and a permission unit that permits a use of the services when the check-in process is completed for the specific user who is identified on the basis of the face image of the specific user.

An accommodation management apparatus according to an example aspect of the present disclosure includes: a visiting user image acquisition unit that obtains a face image of a visiting user who uses a check-in terminal installed at a visible position from a reception counter of an accommodation facility; an execution unit that identifies the visiting user on the basis of the face image of the visiting user and performs a check-in process of the visiting user; and a registration unit that registers the face image of the visiting user who performs the check-in process, as a face image of a permitted user who is allowed to use services provided in the accommodation facility.

An accommodation management apparatus according to another example aspect of the present disclosure includes: a permitted user image acquisition unit that obtains a face image of a visiting user who uses a check-in terminal installed at a visible position from a reception counter of an accommodation facility and a face image of a permitted user who is allowed to use services provided in the accommodation facility; a specific user image acquisition unit that obtains a face image of a specific user who uses the services; and a permission unit that permits a use of the services when the specific user is determined to be the permitted user by face authentication using the face image of the specified user and the face image of the permitted user.

An example advantage according to the accommodation management system, the accommodation management apparatus, the accommodation management method, and the non-transitory program recording medium in respective example aspects of the present disclosure is to be allowed to appropriately manage a user's check-in at accommodations and service use.

EXAMPLE EMBODIMENT

Hereinafter, with reference to the drawings, a description will be given to example embodiments of the accommodation management system, the accommodation management apparatus, the accommodation management method, and the program recording medium.

First Example Embodiment

An accommodation management system according to a first example embodiment will be described with reference to FIG. 1 to FIG. 4.

(System Configuration)

Figure 1:
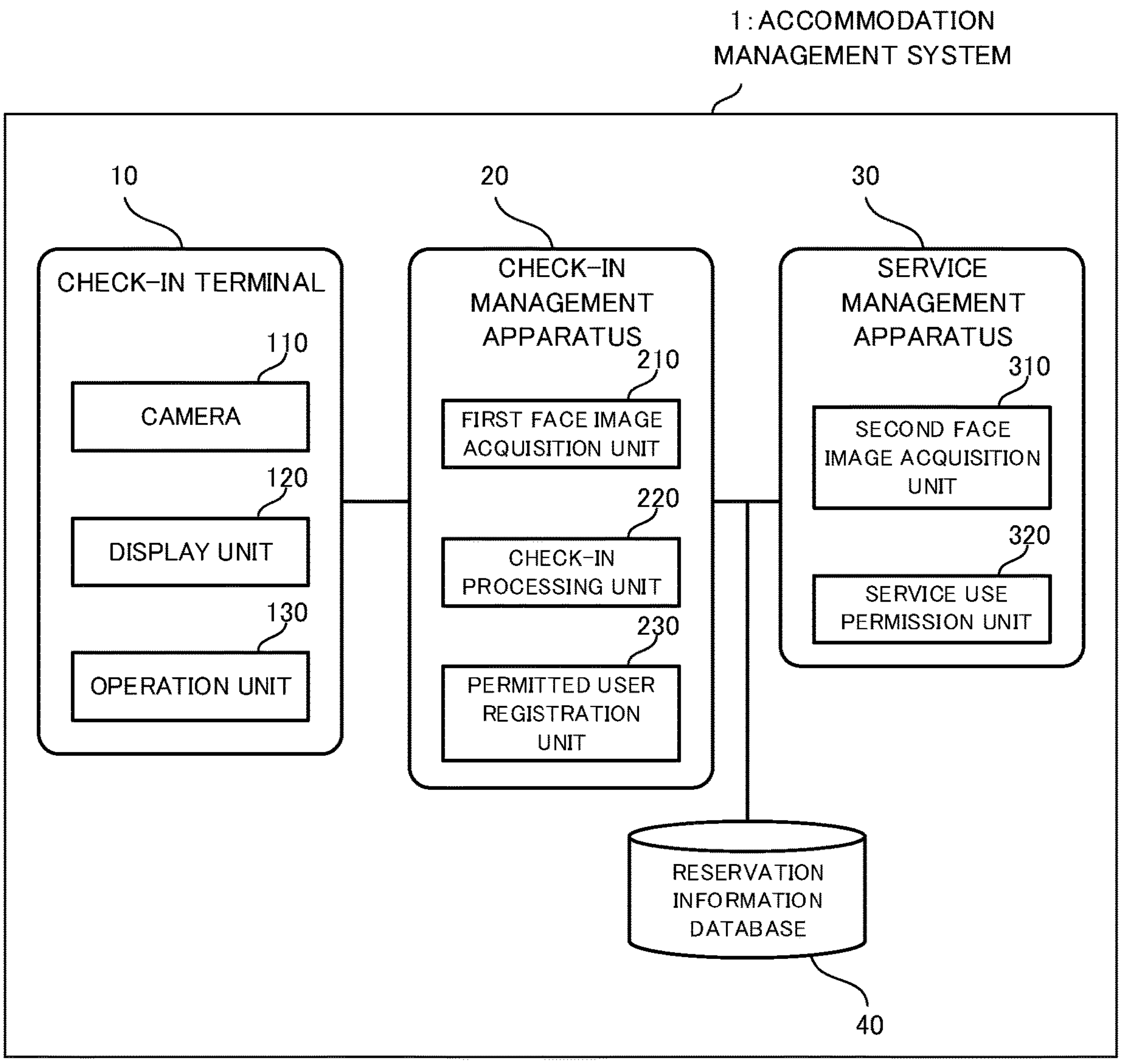
FIG. 1 is a block diagram illustrating a specific configuration of an accommodation management system according to a first example embodiment.

Firstly, a specific system configuration of an accommodation management system 1 according to the first example embodiment will be described with reference to FIG. 1. FIG. 1 is a block diagram illustrating the specific configuration of the accommodation management system according to the first example embodiment.

As illustrated in FIG. 1, the accommodation management system 1 according to the first example embodiment is provided with a check-in terminal 10, a check-in management apparatus 20, a service management apparatus 30, and a reservation information database 40.

The check-in terminal 10 is a terminal for a user who visits an accommodation facility to perform a check-in procedure, and it is provided at a visible position from a reception counter with an employee of the accommodation facility (in other words, a check-in counter (a manned counter or a counter with a person)). The check-in terminal 10 includes, for example, a tablet. The check-in terminal 10 is provided with a camera 110 that is configured to capture or image a face of a user (hereinafter, referred to as a "visiting user" as occasion demands) who operates the check-in terminal 10. Note that the camera 110 may be provided in the check-in terminal 10 itself, or it may be installed at a position where the face of the user who operates the check-in terminal 10 may be captured. The camera 110 may also be configured to capture not only the face of the visiting user but also a face of his or her traveling companion. The check-in terminal 10 is further provided with a display unit 120 for performing various displays, and an operation unit 130 that is operated by the visiting user. The display unit 120 and the operation unit 130 may be integrally provided, for example, like a touch panel. A face image captured by the camera 110 of the check-in terminal 10, various information inputted by the operation unit 130 may be outputted to the check-in management apparatus 20.

According to the check-in terminal 10, it is possible to perform a check-in process automatically without a staff of the accommodation facility; however, the check-in process may be performed in a manner pursuant to the Hotel Business Law because the check-in terminal 10 is provided at the visible position from the reception counter as described above. Note that the check-in terminal 10 is preferably installed at a position close to the reception counter, but it may be installed at a distance in a range without departing from the Hotel Business Law. In this case, the check-in terminal 10 is not necessarily installed at the visible position from the reception counter.

The check-in management apparatus 20 is an apparatus that manages the check-in at the accommodation facility, and is configured, for example, as a part of a server possessed by the accommodation facility. The check-in management apparatus 20 is provided, as its main components, with a first face image acquisition unit 210, a check-in processing unit 220, and a permitted user registration unit 230.

The first face image acquisition unit 210 is configured to obtain a face image of the visiting user from the camera of the check-in terminal 10. The check-in processing unit 220 is configured to perform identity verification by face authentication using a face image of the visiting user (i.e., the face image obtained by the first face image acquisition unit 210) and a face image of a user who has a reservation for the accommodation (e.g., an image stored in advance in the reservation information database 40), and is configured to perform the check-in process of checking in at the accommodation facility. The check-in processing unit 220 reads information (e.g., name and address, etc.) about the user registered in advance and performs the check-in process when the identity verification by the face authentication is successful. Upon the face authentication, for example, a feature quantity may be extracted from each of images to be compared (or a feature quantity extracted from the image in preprocessing performed by the camera or the like may be received), and the visiting user may be identified on the basis of a similarity degree obtained as a result of comparison between the feature quantities of the images. Here, the "feature quantity" is a peculiar value that may be extracted from the face image: for example, values of various parameters (e.g., brightness of each pixel, etc.) of the face image and a value that may be calculated from the various parameters. The similarity degree of the feature quantities is a value that indicates to what extent the feature quantities to be compared is similar, and is calculated, for example, as a score of 0 to 1 (wherein 1 indicates a perfect match). When comparing the feature quantities, the check-in management apparatus 20 may store the information about the user and the feature quantity of the user's face in association with each other (in other words, the check-in management apparatus 20 may not need to store the face image of the user). Note that a determination method using the feature quantity of the face image is merely an example, and other existing technologies may be used to perform the face authentication (the same applies to a service use permission unit 320 described later). The permitted user registration unit 230 registers the face image of the visiting user (and his or her traveling companion) who performs the check-in process in the reservation information database 40 as a face image of a permitted user who is permitted to use services provided in the accommodation facility. The face image of the permitted user is registered with the information that indicates the availability of each of the services that can be used by the user at the accommodation facility.

The service management apparatus 30 is an apparatus that manages the use of the services provided in the accommodation facility (e.g., the use of equipment or facilities of various types such as a guest room), and is provided at the entrance of equipment for providing the services or around an area for performing a procedure to use the equipment. Alternatively, the service management apparatus 30 may be provided at a distance from the equipment, as a server that is configured to communicate with a terminal provided in each equipment for providing the services. In this case, the service management apparatus 30 may be configured as an apparatus that manages the use of a plurality of types of services in the accommodation facility. The service management apparatus 30 is provided, as its main components, with a second face image acquisition unit 310 and a service use permission unit 320.

The second face image acquisition unit 310 is configured to obtain a face image of a user (hereinafter referred to as a "specific user" as occasion demands) who intends to use the services, from a camera installed near the entrance of each equipment for providing the services or the like. The service use permission unit 320 is configured to permit the use of the services by comparing the face image of the specific user (i.e., the face image obtained by the second face image acquisition unit 310) with the face image of the permitted user (i.e., the face image registered by the permitted user registration unit 230). The service use permission unit 320, for example, extracts the feature quantity from each of images to be compared (or receives the feature quantity extracted from the image in the preprocessing performed by the camera or the like) and determines whether or not the face images indicate the same person on the basis of the similarity degree obtained as the result of comparison between the feature quantities of the images. The permitted user (i.e., the user who is permitted to use the services) may be managed, for example, by a "permission flag" that is added to a user information. Specifically, when the check-in process is performed in the check-in processing unit 220, the permission flag of the services that are available to the user (e.g., a room to stay at, etc.) is set (e.g., it is changed from "0" to "1"). In this manner, the use of the permission flag makes it possible to easily determine whether or not a person of interest is the user who is permitted to use the services. In this case, it is also possible to determine whether or not to permit the use of the services depending on whether or not the permission flag of the user who is determined to be the same person by the similarity degree, for example. An example of specific aspects of permitting the use of the services includes, for example, unlocking a door at the entrance of the equipment, notifying the equipment staff, performing an entry procedure by the system (in other words, granting an equipment utilization qualification to the user), and the like.

The reservation information database 40 is a storage apparatus that is configured to communicate with the check-in management apparatus 20 and the service management apparatus 30, and is configured to store the face image of the user (in addition to which or in place of which, the feature quantity of the face image) and the information that is related to an accommodation reservation information in association with each other. Note that the face image of the user is stored, for example, when the user makes a reservation for the accommodation facility. For example, when the user performs a reservation procedure on the Internet through the user's terminal, the user may upload the face image of an accommodation guest (including his or her traveling companion) and store it in the reservation information database 40. It is also possible to use a configuration in which the face image is not uploaded when the user performs the reservation procedure and the face image is registered at the accommodation facility. Moreover, the reservation information database 40 may associate and store the face image of the user who performs the check-in process and the information that indicates whether or not the use of the services is permitted, as the face image of the permitted user. The face image stored in the reservation information database 40 is configured to be read and updated by the check-in management apparatus 20 and the service management apparatus 30. The reservation information database 40 may be configured as a storage apparatus that is external to the system (e.g., an external server, a database, a cloud, or the like). In this case, the reservation information database 40 may be configured to at least partially include a function of performing the face authentication (i.e., collation of the face images) of the check-in management apparatus 20 or the service management apparatus 30. The accommodation reservation information is configured to include at least one of a reservation number, a membership ID, a name of a guest, a gender of the guest, an accommodation date, the number of guests, an accommodation charge, a scheduled room number, and a user's e-mail address.

(Hardware Configuration)

Figure 2:
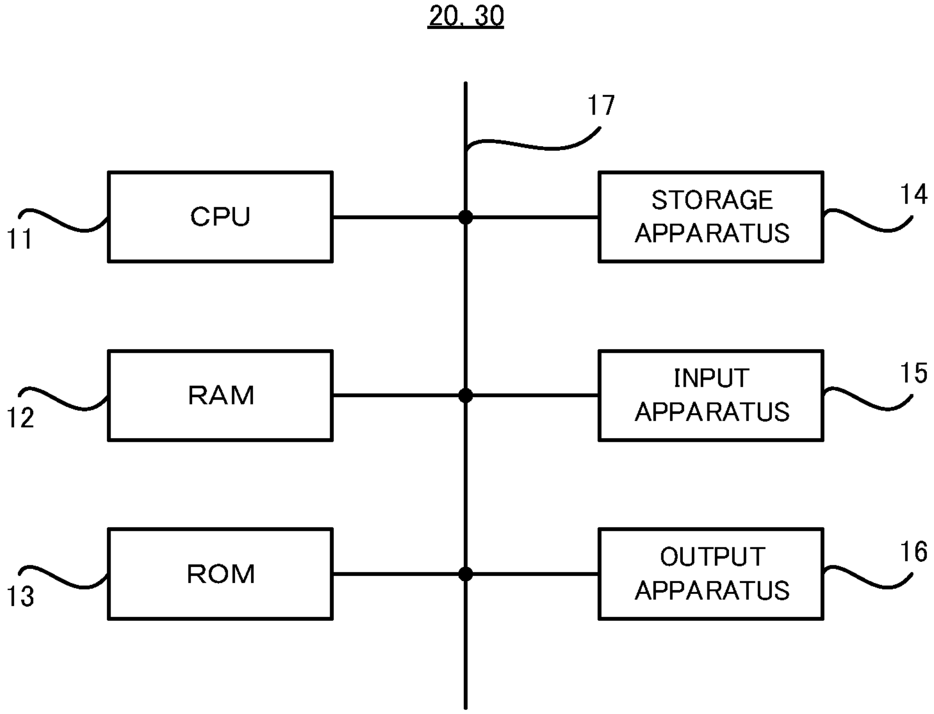
FIG. 2 is a block diagram illustrating a hardware configuration of the accommodation management system according to the first example embodiment.

Next, a hardware configuration of the accommodation management system according to the first example embodiment (especially, the check-in management apparatus 20 and the service management apparatus 30) will be described with reference to FIG. 2. FIG. 2 is a block diagram illustrating the hardware configuration of the accommodation management system according to the first example embodiment.

As illustrated in FIG. 1, the check-in management apparatus 20 and the service management apparatus 30 included in the accommodation management system 1 according to the first example embodiment is provided with a CPU (Central Processing Unit) 11, a RAM (Random Access Memory) 12, a ROM (Read Only Memory) 13, a storage apparatus 14, an input apparatus 15, and an output apparatus 16. The CPU 11, the RAM 12, the ROM 13, the storage apparatus 14, the input apparatus 15, and the output apparatus 16 are connected through a data bus 17.

The CPU 11 reads a computer program. For example, the CPU 11 may read a computer program stored by at least one of the RAM 12, the ROM 13 and the storage apparatus 14. For example, the CPU 11 may read a computer program stored in a computer-readable recording medium by using a not-illustrated recording medium reading apparatus. The CPU 11 may obtain (i.e., read) a computer program from a not-illustrated apparatus located outside the check-in management apparatus 20 and the service management apparatus 30 through a network interface. The CPU 11 controls the RAM 12, the storage apparatus 14, the input apparatus 15, and the output apparatus 16 by executing the read computer program. Especially in the present example embodiment, when the CPU 11 executes the read computer program, a function block for managing the check-in or for managing the use of the services is implemented in the CPU 11. That is, the CPU 11 is allowed to function as a controller for managing the check-in or the service use.

The RAM 12 temporarily stores the computer program executed by the CPU 11. The RAM 12 temporarily stores the data that is temporarily used by the CPU 11 while the CPU 11 executes the computer program. The RAM 12 may be, for example, a D-RAM (Dynamic RAM).

The ROM 13 stores the computer program executed by the CPU 11. The ROM 13 may also store fixed data. The ROM 13 may be, for example, a P-ROM (Programmable ROM).

The storage apparatus 14 stores the data that is stored by the check-in management apparatus 20 and the service management apparatus 30 for a long period of time. The storage apparatus 14 may operate as a temporary storage apparatus for the CPU 11. The storage apparatus 14 may include, for example, at least one of a hard disk apparatus, a magneto-optical disk apparatus, a SSD (Solid State Drive) and a disk array device.

The input apparatus 15 is an apparatus that receives an input instruction from the user of the check-in management apparatus 20 and the service management apparatus 30. The input apparatus 15 may include, for example, at least one of a keyboard, a mouse, and a touch panel.

The output apparatus 16 is an apparatus that outputs information about the check-in management apparatus 20 and the service management apparatus 30 to the outside. For example, the output apparatus 16 may be a display apparatus that is allowed to display the information about the check-in management apparatus 20 and the service management apparatus 30.

(Outline of Operation)

Next, an outline of operations realized by the accommodation management system 1 according to the first example embodiment. In the following, the use of a guest room will be described as an example of the services permitted by the accommodation management system 1.

When the user visits the accommodation facility, the check-in management apparatus 20 collates the face image of the visiting user obtained by the check-in terminal 10 with the face image of the user registered when the accommodation reservation is made, by the face authentication. Specifically, the check-in management apparatus 20 compares the face image of the visiting user with the face image of the user registered when the accommodation reservation is made, and determines whether or not they are the same person. After confirming that they are the same person, the check-in management apparatus 20 performs the check-in process of the user. In this case, the face image of the user who performs the check-in process may be registered as the face image of the permitted user who is allowed to use the services of the accommodation facility.

A description will be given to the case where the user did not upload the face image of an accommodation guest beforehand. The check-in management apparatus 20 collates the face image of the visiting user obtained by the check-in terminal 10 with the face images stored in the database, and determines that the user cannot be identified. When the user cannot be identified, the check-in management apparatus 20 outputs a message to the user to input a reservation number or a reservation code (e.g., a two-dimensional bar code) through the check-in terminal 10 (displays, or outputs by voice, a screen for inputting a reservation number or a face authentication failure on the display of the check-in terminal 10). When the user enters the reservation number or the reservation code, the check-in terminal 10 notifies the check-in management apparatus 20, and the check-in management apparatus 20 performs the check-in process of the user corresponding to the reservation number or the reservation code. When the check-in is completed, the check-in management apparatus 20 displays this fact through the check-in terminal 10 and displays whether or not the user who performs the check-in process accepts the registration of the face image of the user. When the user chooses to register the face, the check-in management apparatus 20 registers the face image of the user as the face image of the permitted user who is allowed to use the services of the accommodation facility.

Then, when the user intends to enter a guest room (i.e., a room assigned upon check-in), the service management apparatus 30 collates the face image of the user who intends to enter the room with the face image of the user registered as the user of the guest room (i.e., the face image of the permitted user). Then, when comparing the face image of the user who intends to enter the room with the face image of the permitted user and after confirming that they are the same person, the service management apparatus 30 unlocks the door of the guest room. Note that the service management apparatus 30 may be configured to permit an entry to equipment or facilities of various types in a hotel (e.g., equipment for hotel guests only, etc.), in addition to the guest rooms.

(Operations of Check-In Management Apparatus)

Figure 3:
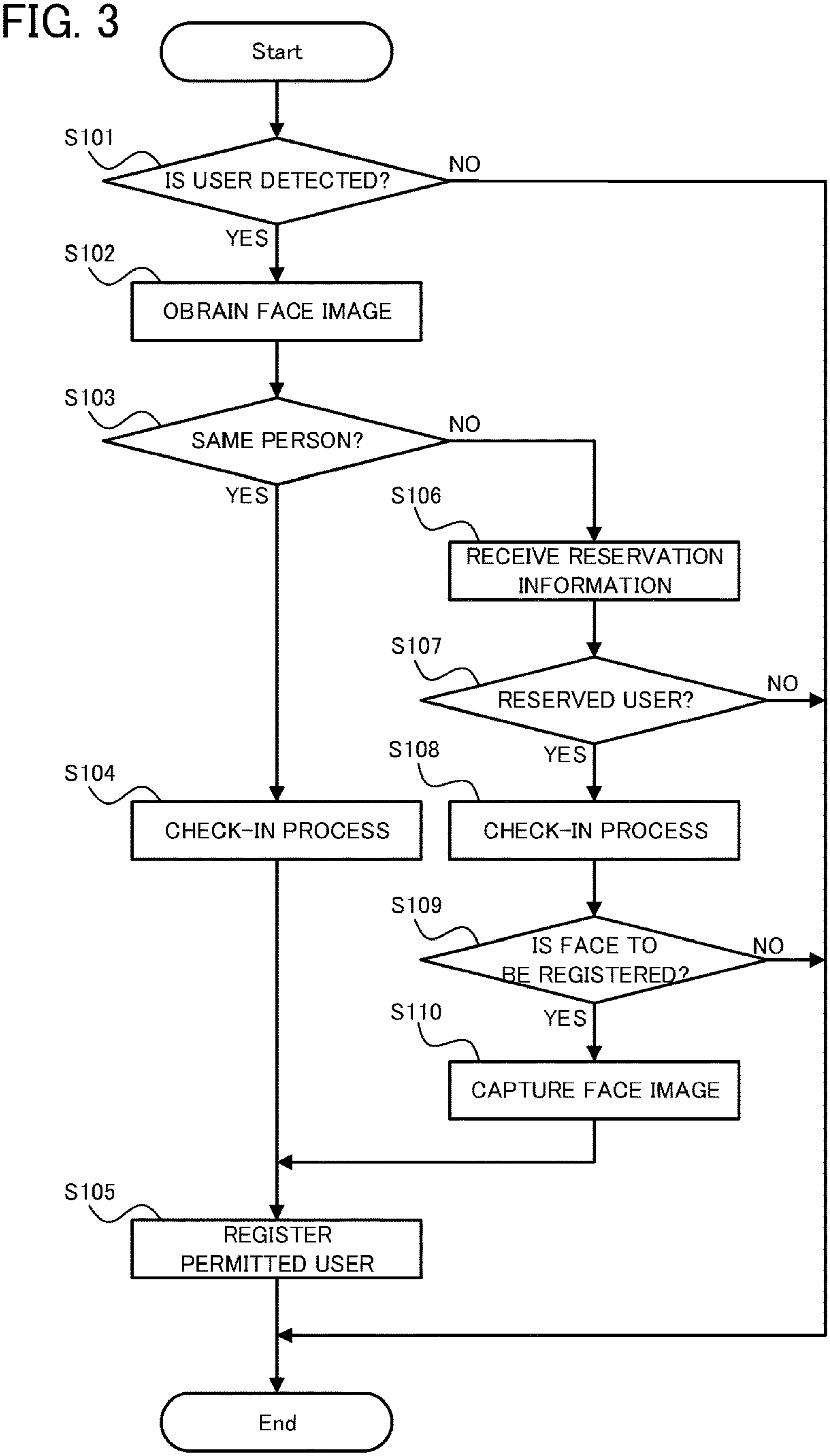
FIG. 3 is a flowchart illustrating a flow of operations of a check-in management apparatus according to the first example embodiment.

Next, a flow of a process performed by the check-in management apparatus 20 according to the first example embodiment will be described with reference to FIG. 3. FIG. 3 is a flowchart illustrating a flow of operations of the check-in management apparatus according to the first example embodiment.

As illustrated in FIG. 3, the check-in management apparatus 20 firstly determines whether or not the presence of a user who intends to perform the check-in procedure at the hotel is detected (step S101). The presence of such a user may be detected, for example, by various sensors installed in the check-in terminal 10, or may be detected when a predetermined operation is performed in the check-in terminal 10. If the presence of the user is not detected (the step S101: NO), the subsequent steps are omitted and a series of operations is ended. In this case, the S101 is performed again after a lapse of a predetermined period.

When the presence of the user is detected (the step S101: YES), the face image of the user is captured by the camera 110 installed in or around the check-in terminal 10, and the first face image acquisition unit 210 obtains the face image (step S102). When the face image of the user cannot be normally obtained (in other words, when the face image that may be used for the face authentication cannot be obtained), an instruction for directing the face to the camera or an instruction for exposing the face (e.g., taking off sunglasses or a mask) may be outputted to the user.

Subsequently, the check-in processing unit 220 collates the captured face image of the visiting user with the face image of the user registered, and determines whether or not they are the same person (step S103).

If it is determined that they are the same person by collating the face image of the visiting user with the face image of the user registered (the step S103: YES), the check-in processing unit 220 performs the check-in process of the user (step S104). At this time, the fact that the check-in process is performed may be displayed to the user on the display unit 120. Then, the permitted user registration unit 230 registers the face image of the visiting user who has checked in, in the reservation information database 40, as the face image of the permitted user who is allowed to use the services provided in the accommodation facility (step S105). Alternatively, the check-in processing unit 220 may register the information that is related to the service use permission, in association with the face image that is already stored by the reservation information database 40 by the user who performs the check-in process registering it upon the reservation, in in the reservation information database 40.

On the other hand, if it is not determined that they are the same person by collating the face image of the visiting user with the face image of the user registered (the step S103: YES), the check-in terminal 10 receives an input of the reservation information (step S106). In this case, a message or the like that prompts the input of the reservation information is displayed on the check-in terminal 10. The reservation information is for determining whether or not the user has a reservation for the accommodation facility, which is, for example, a reservation number or a reservation code. Subsequently, the check-in processing unit 220 determines whether or not the visiting user has a reservation for the accommodation facility by using the received reservation information (step S107). If it is determined that the visiting user does not have a reservation for the accommodation facility (step S107: NO), the subsequent steps are omitted.

If it is determined that the visiting user has a reservation for the accommodation facility (the step S107: YES), the check-in processing unit 220 performs the check-in process of the user (step S108). Then, the check-in processing unit 220 confirms whether the visiting user accepts the face registration (step S109). Specifically, for example, a message for asking whether or not the user accepts the face registration is displayed on the check-in terminal 10 so that the user selects the answer. Here, when the visiting user permits the face registration (the step S109: YES), the camera 110 captures the face image of the visiting user (step S110). Then, the permitted user registration unit 230 registers the captured face image of the visiting user in the reservation information database 40 as the face image of the permitted user who is allowed to use the services provided in the accommodation facility (step S105). If the visiting user does not permit the face registration (the step S109: NO), the face registration of the permitted user is not performed. In this case, the user who has checked in may use the services provided in the accommodation facility, in a manner other than the face authentication.

As described above, the check-in management apparatus 20 performs the check-in process of the user who is confirmed to have a reservation, and registers the face image of the user who has checked in as the face image of the permitted user. However, when the user performs a hotel checkout procedure or when a service use period ends, the registration as the permitted user by the step S105 may be canceled.

(Operation of Service Management Apparatus)

Figure 4:
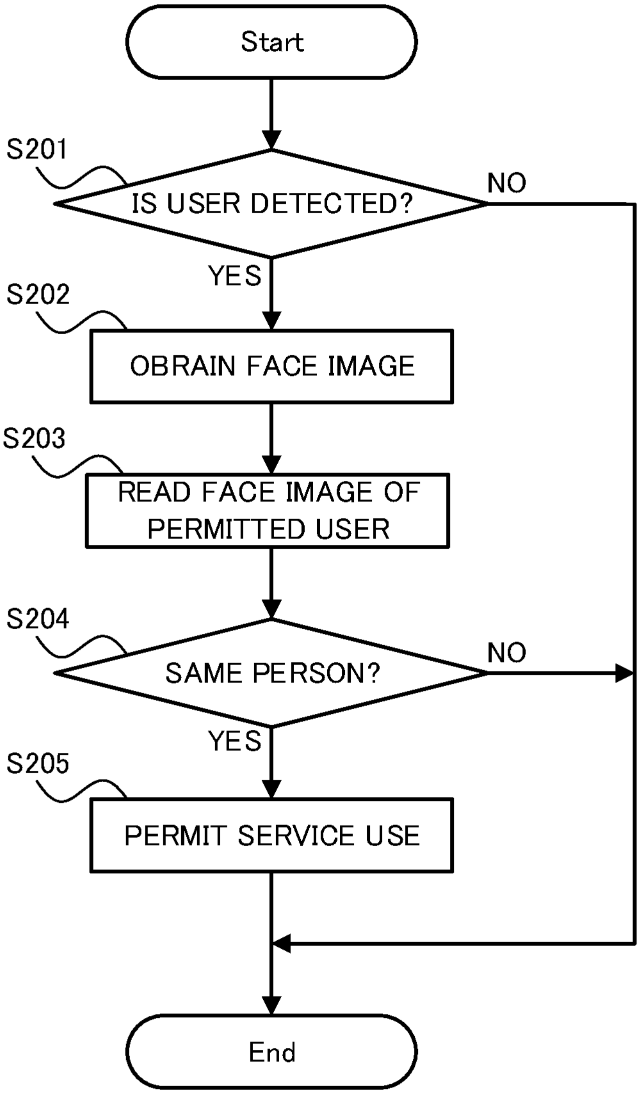
FIG. 4 is a flowchart illustrating a flow of operations of a service management apparatus according to the first example embodiment.

Next, a flow of a process performed by the service management apparatus 30 according to the first example embodiment will be described with reference to FIG. 4. FIG. 4 is a flowchart illustrating a flow of operations of the service management apparatus according to the first example embodiment.

As illustrated in FIG. 4, the service managing apparatus 30 firstly determines whether or not the presence of a user who intends to use the services provided in the accommodation facility is detected (step S201). The presence of such a user may be detected, for example, by various sensors installed around the entrance of the equipment where the services are provided, or may be detected when the user performs a predetermined operation with a terminal installed around the entrance of the equipment (or with a terminal owned by the user). If the presence of the user is not detected (the step S201: NO), the subsequent steps are omitted and a series of operations is ended. In this case, the step S201 is performed again after a lapse of a predetermined period.

When the presence of the user is detected (the step S201: YES), the face image of the user is captured by a camera installed around the entrance of the equipment where the services are provided, and the second face image acquisition unit 310 obtains the face image (step S202). When the face image of the user cannot be normally obtained (in other words, when the face image that may be used for the face authentication cannot be obtained), an instruction for directing the face to the camera or an instruction for exposing the face (e.g., taking off sunglasses or a mask) may be outputted to the user.

Subsequently, the service use permission unit 320 reads the face image of the user who is to be permitted to use the services (i.e., the face image of the permitted user) from the reservation information database 40 (step S203). Specifically, if the services are using a guest room, the face image of a user assigned to the room is read, and if the services are using the equipment that can be used by any guest, the face images of all the guests are read.

After that, the service use permission unit 320 collates the captured face image of the user with the face image of the permitted user, and determines whether or not they are the same person (step S204).

If it is determined that the captured face image of the user and the face image of the permitted user belong to the same person (the step S204: YES), the service use permission unit 320 permits the user to use the service (step S205). For example, the service use permission unit 320 permits an entry to the equipment where the services are provided, by unlocking the door lock of the equipment. At this time, display may be made on a terminal near the entrance of the equipment to indicate that the door lock of the equipment is unlocked.

On the other hand, if it is determined that the captured face image of the user and the face image of the permitted user do not belong to the same person (the step S204: NO), the above-described step S205 is not performed. That is, the user is not permitted to use the services. Note that if it can be determined that the user is making a mistake on the services to use (e.g., that the user is confusing his or her guest room with another guest room) (specifically, the check-in process is performed, but the user is not assigned to that room), display may be made to inform the user that the services to use are incorrect.

(Technical Effects)

Next, a description will be given to technical effects obtained by the accommodation management system 1 according to the first example embodiment.

As described in FIG. 1 to FIG. 4, according to the accommodation management system 1 in the first example embodiment, the face authentication is allowed to appropriately manage the check-in of the accommodation facility and the use of services provided in the accommodation facility. Specifically, the face authentication at the time of performing the check-in process and the face authentication at the time of permitting the use of the service are performed by using a common face image stored in the reservation information database 40, so that the face authentication may be efficiently performed. Moreover, since it is not necessary to register different respective face images with different two types of authentication processes, labor can be reduced on the accommodation management side and on the user side.

Moreover, when the use of the services is permitted, the face authentication may be performed only on the users who have checked in at the accommodation facility (in other words, the number of face images to be collated may be limited), so that the face authentication may be realized with higher accuracy. In addition, utilizing the fact that the face images for permitting the use of the services may be limited, a threshold value used for the face authentication when permitting the use of the services may be set as a higher value than a threshold value used for the face authentication upon check-in. Here, the "threshold value" is set for a parameter that is used for the determination in the face authentication (e.g., the similarity degree obtained as the result of comparison between the face images, etc.), and when the parameter exceeds the threshold value, it is determined that the face authentication is successful, and when the parameter is less than or equal to the threshold value, it is determined that the face authentication has failed. Therefore, the higher the threshold value is, the harder it is determined that the face images indicate the same person, and this improves the accuracy of the face authentication. Setting a relatively high threshold value when permitting the use of the services makes it possible to avoid a situation in which the use of the equipment is permitted even for users who should not be permitted, in the face authentication when permitting the use of the services with a relatively small number of face images to be collated. On the other hand, since the threshold value for the face authentication upon check-in is relatively low, it is possible to avoid a situation in which the check-in process is not performed even though the face images are normally registered, in the face authentication upon check-in with a relatively large number of face images to be collated. Contrarily, the threshold value used for the face authentication upon check-in may be set as a higher value than the threshold value used for the face authentication when permitting use of the services. In this case, it is possible to avoid performing an incorrect check-in process. On the other hand, when the use of the services is permitted, the user to be authenticated is restricted (i.e., only the user who has checked in needs to be authenticated). Thus, even the use of a relatively low threshold value does not significantly reduce the authentication accuracy.

Second Example Embodiment

Next, a description will be given to the accommodation management system 1 according to a second example embodiment. Note that the second example embodiment is different from the first example embodiment described above only in some configurations and operations, and is substantially the same in the other parts. For this reason, the part that is different from the first example embodiment shall be described in detail below, and the other overlapping parts shall be omitted from the description as occasion demands.

(System Configuration)

Figure 5:
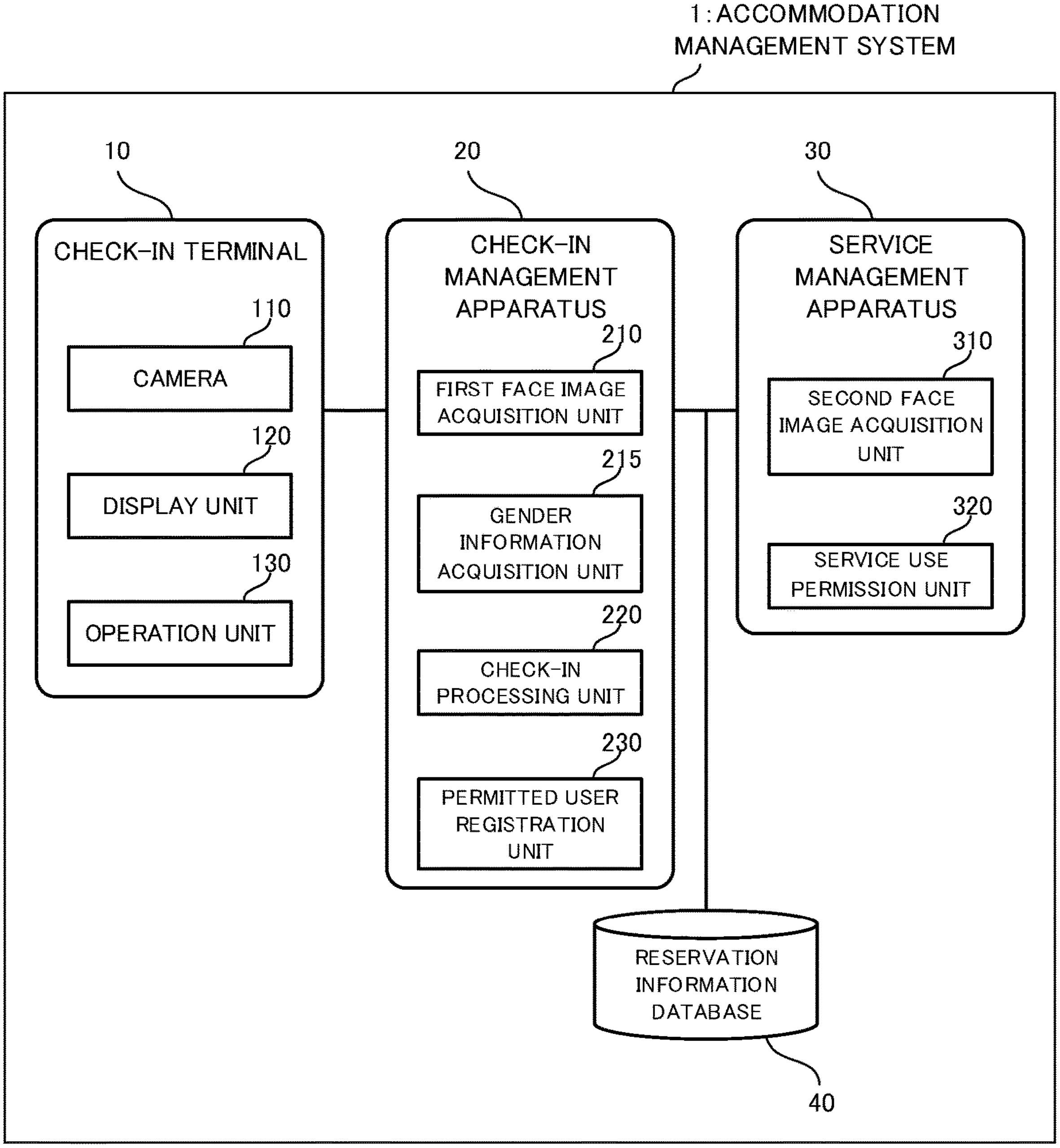
FIG. 5 is a block diagram illustrating a specific configuration of an accommodation management system according to a second example embodiment.

Firstly, a specific system configuration of the accommodation management system 1 according to the second example embodiment will be described with reference to FIG. 5. FIG. 5 is a block diagram illustrating the specific configuration of the accommodation management system according to the second example embodiment. Incidentally, FIG. 5 carries the same reference numerals as those of the same components illustrated in FIG. 1.

As illustrated in FIG. 5, in the accommodation management system 1 according to the second example embodiment, the check-in management apparatus 20 is provided with a gender information acquisition unit 215 in addition to the configuration of the first example embodiment (refer to FIG. 1).

The gender information acquisition unit 215 is configured to obtain a gender information about the gender of the visiting user. The gender information of the visiting user is inputted by the user, for example, through the operation unit 130 of the check-in terminal 10. Alternatively, it may be obtained by automatically determining the gender from the image captured by the camera 110 of the check-in terminal 10. Moreover, when the identify verification of the visiting user is successful on the check-in processing unit 220, the gender information may be obtained from the user information registered in advance (i.e., the user information registered when the reservation is made).

The gender information acquisition unit 215 registers the obtained gender information in the reservation information database 40 in association with the face image of the permitted user. The registered gender information is used when the service management apparatus 30 determines the availability of the services. A specific method of using the gender information will be described in detail below.

(Operation of Service Management Apparatus)

Figure 6:
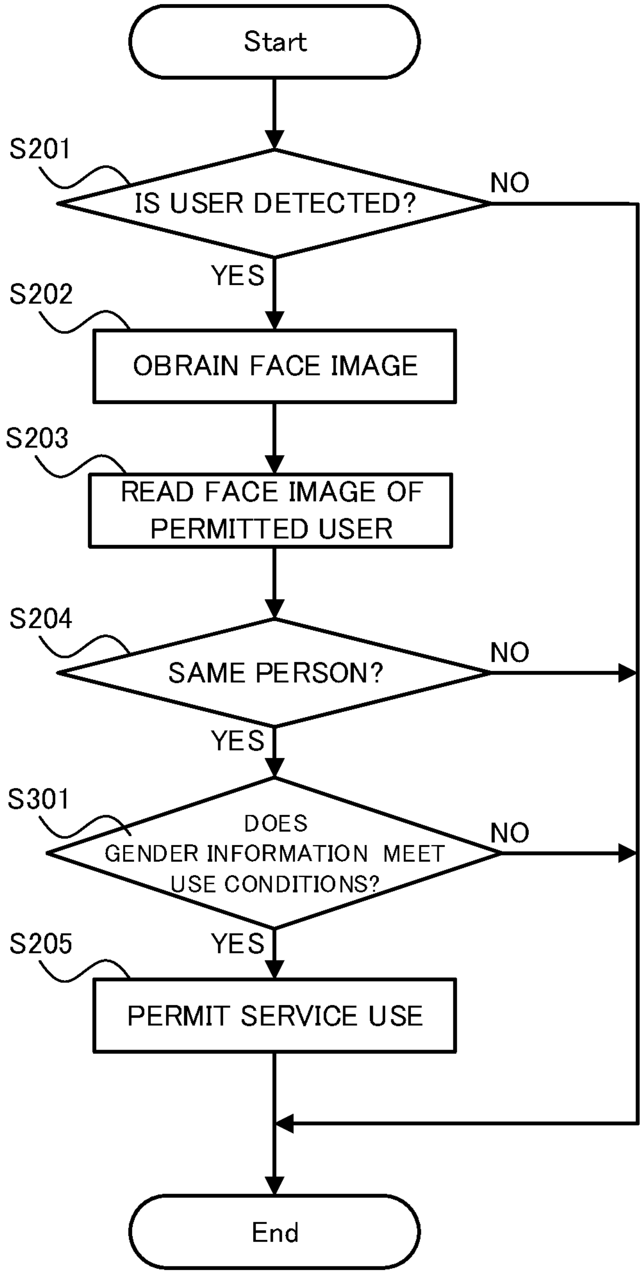
FIG. 6 is a flowchart illustrating a flow of operations of a service management apparatus according to the second example embodiment.

Next, a flow of a process performed by the service managing apparatus 30 according to the second example embodiment will be described with reference to FIG. 6. FIG. 6 is a flowchart illustrating a flow of operations of the service management apparatus according to the second example embodiment. Incidentally, FIG. 6 carries the same reference numerals as those of the same steps illustrated in FIG. 4.

As illustrated in FIG. 6, in operation of the service managing apparatus 30 according to the second example embodiment, the step S201 to the step S204 are performed as in the first example embodiment described above. That is, the face authentication is performed by using the face image of the specific user who intends to use the services and the face image of the permitted user. If it is determined that the face image of the specific user and the face image of the permitted user do not belong to the same person (the step S204: NO), the subsequent steps are omitted and a series of operations is ended. In this case, there is no difference in operation from the first example embodiment.

On the other hand, if it is determined that the face image of the specific user and the face image of the permitted user belong to the same person (the step S204: YES), the service use permission unit 320 determines whether or not the gender information of the permitted user meets use conditions of the services (step S301). If it is determined that the gender information of the permitted user meets the use conditions of the services (the step S301: YES), the service use permission unit 320 permits the user to use the service (the step S205).

On the other hand, if it is determined that the gender information of the permitted user does not meet the use conditions of the services (the step S301: NO), the step S205 is not performed. That is, the user is not permitted to use the services.

(Technical Effects)

Next, a description will be given to technical effects obtained by the accommodation management system 1 according to the second example embodiment.

As described in FIG. 5 and FIG. 6, according to the accommodation management system 1 in the second example embodiment, the use of the services is permitted when the face authentication using the face image of the specific user and the face image of the permitted user is successful and when the gender information meets the use conditions of the services. In other words, even if the specific user who intends to use the services can be determined to be the same person as the permitted user, the use of the services is not permitted unless the gender information meets the use conditions of the services.

For example, in a large public bath or the like of the accommodation facility, an available bathroom varies depending on the gender of the user. Thus, the services provided in the accommodation facility may have gender-related conditions. In the accommodation management system 1 in the second example embodiment, when such services are provided, the availability is determined by using the gender information in addition to the face authentication. It is therefore possible to determine the availability of the services, more appropriately.

Moreover, an entry to a particular facility may be restricted by using an age information about the age of the user in addition to or in place of the gender. Specifically, the service use permission unit 320 determines whether the age information of the permitted user meets the use conditions of the services. For example, when the user enters a facility where alcohol is provided in the accommodation facility, the service use permission unit 320 determines whether or not the permitted user is over 20 years old on the basis of the age information of the permitted user, and when it is determined that the age information of the permitted user meets the use conditions of the services (or that the permitted user is over 20 years old), the service use permission unit 320 permits the user to use the services.

Third Example Embodiment

Next, a description will be given to the accommodation management system 1 according to a third example embodiment. Note that the third example embodiment is different from the first and second example embodiments described above only in some configurations and operations, and is substantially the same in the other parts. For this reason, the part that is different from the first and second example embodiments shall be described in detail below, and the other overlapping parts shall be omitted from the description as occasion demands.

(System Configuration)

Figure 7:
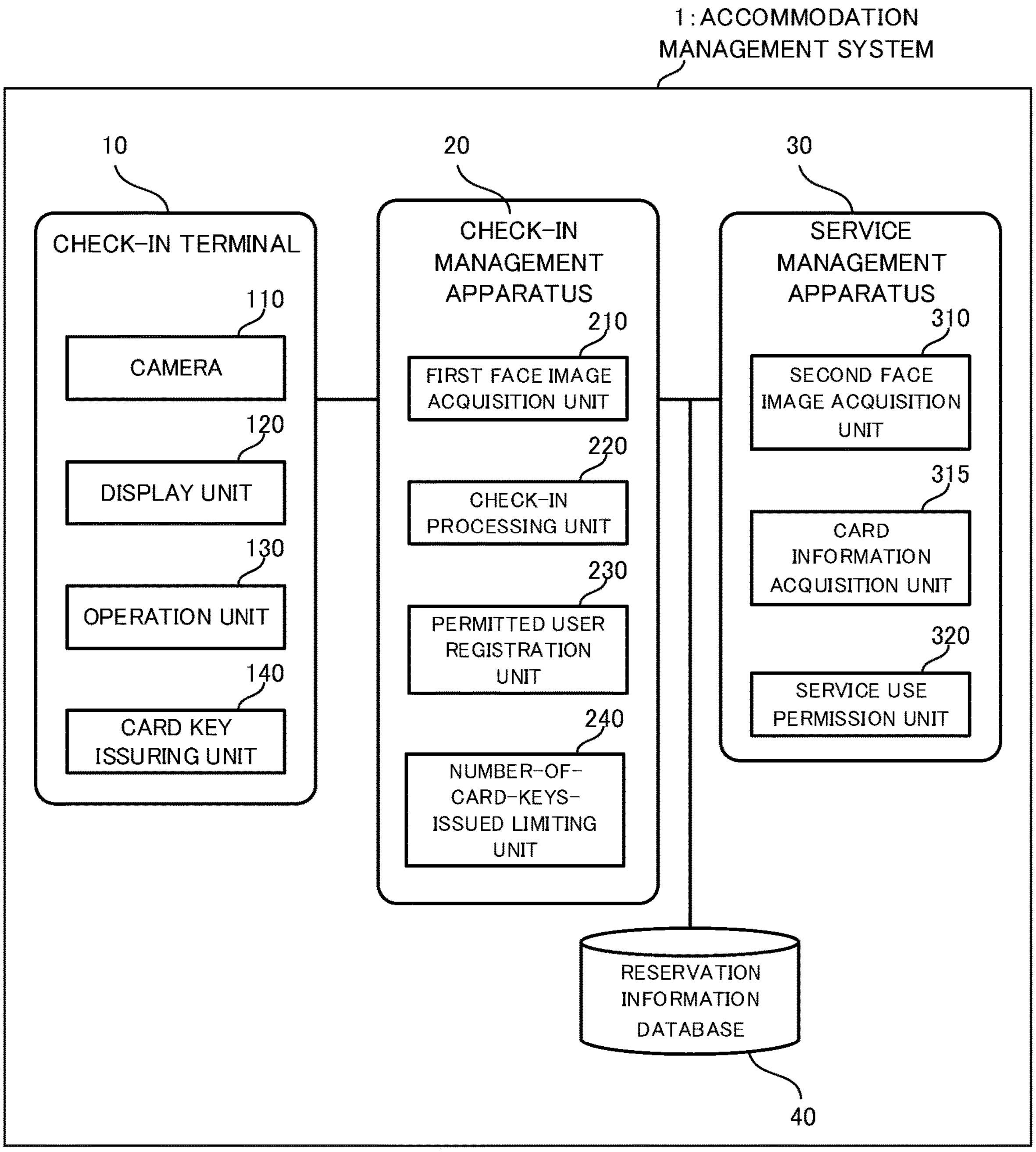
FIG. 7 is a block diagram illustrating a specific configuration of an accommodation management system according to a third example embodiment.

Firstly, a specific system configuration of the accommodation management system 1 in the third example embodiment will be described with reference to FIG. 7. FIG. 7 is a block diagram illustrating the specific configuration of the accommodation management system according to the third example embodiment. Incidentally, FIG. 7 carries the same reference numerals as those of the same components illustrated in FIG. 1.

As illustrated in FIG. 7, in the accommodation management system 1 according to the third example embodiment, the check-in terminal 10 is provided with a card key issuing unit 140 in addition to the configuration of the first example embodiment (refer to FIG. 1). Moreover, the check-in management apparatus 20 is provided with the number-of-card-keys-issued limiting unit 240, and the service management apparatus 30 is provided with a card information acquisition unit 315.

The card key issuing unit 140 issues a card key for using the services provided in the accommodation facility (e.g., a card key for unlocking the door of a guest room) to the visiting user who performs the check-in process. The card key issuing unit 140 may issue a new card key at each time or may rewrite the information that is stored in the card key.

The number-of-card-keys-issued limiting unit 240 is configured to limit the number of card keys issued by the card key issuing unit 140 in units of groups (specifically, in units of groups each of which includes people for whom the check-in process is performed together). Normally, the number of card keys issued is the number of people included in a group, but when the number-of-card-keys-issued limiting unit 240 limits the number of card keys issued, it is less than the number of people included in the group. A specific limiting method by the number-of-card-keys-issued limiting unit 240 will be described in detail later.

The card information acquisition unit 315 is configured to obtain a card key information about the card key owned by the specific user who intends to use the services (specifically, the information that is related to a service utilization qualification), for example, from a card reader provided near the entrance of the equipment where the services are provided. The card key information obtained by the card information acquisition unit 315 is configured to be outputted to the service use permission unit 320.

Note that the service use permission unit 320 according to the third example embodiment is configured to determine the availability of the services on the basis of the card key information in place of the face authentication. Specifically, when the card key information includes the information that indicates the permission of the service use, the service use permission unit 320 permits the use of the services without performing the face authentication (i.e., without collating the face image of the specific user with the face image of the permitted user). Whether to use the face authentication or the card key for the use of the services may be made selectable by the user. After performing the check-in process, for example, the user selects which to use between the face authentication (face key) or card key authentication, by using the check-in terminal 10.

(Process of Limiting the Number of Card Keys Issued)

Figure 8:
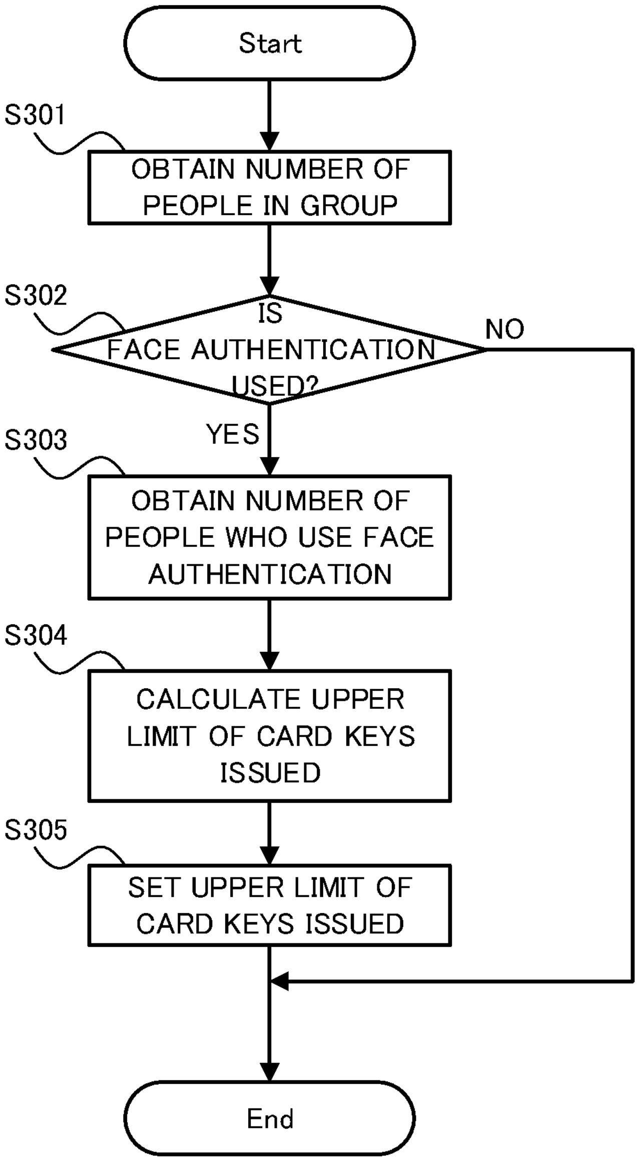
FIG. 8 is a flowchart illustrating a flow of a process of limiting the number of card keys issued, which is performed by the accommodation management system according to the third example embodiment.

Next, a process of limiting the number of card keys issued, which is performed by the accommodation management system 1 according to the third example embodiment (specifically, a process performed by the number-of-card-keys-issued limiting unit 240) will be described with reference to FIG. 8. FIG. 8 is a flowchart illustrating a flow of the process of limiting the number of card keys issued, which is performed by the accommodation management system according to the third example embodiment.

As illustrated in FIG. 8, in the accommodation management system 1 according to the third example embodiment, after the check-in process, the number-of-card-keys-issued limiting unit 240 obtains the number of people in a group for whom the check-in process is performed (i.e., the number of the visiting user and his or her traveling companions for whom the check-in process is performed) (step S301). The number of people in the group is obtained from the reservation information, for example.

Subsequently, the number-of-card-keys-issued limiting unit 240 determines whether or not the group includes a user who wants to use the face authentication for the service use (step S302). If the group does not include any user who wants to use the face authentication (the step S302: NO), the subsequent steps are omitted and a series of operations is ended. In this manner, when there is no user who wants to use the face authentication, it can be determined that all the users in the group use the card key authentication, so that the issuance of the card key is not limited. On the other hand, if the group includes a user who wants to use the face authentication (step S302: YES), the number-of-card-keys-issued limiting unit 240 obtains the number of users in the group who use the face authentication (step S303).

After obtaining the number of users who use the face authentication, the number-of-card-keys-issued limiting unit 240 calculates an upper limit of the number of card keys issued (step S304). The upper limit of the number of card keys issued is calculated by subtracting the number of users who use the face authentication (i.e., the number of users who use the card key authentication) from the number of people in the group, for example.

Then, the number-of-card-keys-issued limiting unit 240 sets the value that is obtained as a calculation result, as the upper limit of the number of card keys issued by the card key issuing unit 140 (step S305).

As a result of the process as described above, the card key is not issued to this group beyond the upper limit of the number of card keys issued. For example, when a group of four people stays at an accommodation facility and if two of them select the face authentication, the remaining two people will use the card key authentication. In this case, the card key issuing unit 140 is allowed to issue up to two card keys. Alternatively, if three of the four people in the group select the face authentication, the remaining one will use the card key authentication. In this case, the card key issuing unit 140 is allowed to issue only one card key. If all the four people in the group select the face authentication, there is no user who will use the card key authentication. In this case, the card key issuing unit 140 is not allowed to issue any card key.

(Technical Effects)

Next, a description will be given to technical effects obtained by the accommodation management system 1 according to the third example embodiment.

As described in FIG. 7 and FIG. 8, according to the accommodation management system 1 in the third example embodiment, the number of card keys issued is limited in accordance with the number of people who want the face authentication for the service use. That is, it is determined that it is not necessary to issue the card key to the user who uses the face authentication, and the number of card keys issued is limited to be less than usual. In this way, it is possible to prevent unnecessary card keys from being issued.

While the present disclosure has been particularly shown and described with reference to example embodiments thereof, the present disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following Supplementary Notes.

SUPPLEMENTARY NOTES

With respect to the example embodiments described above, the following supplemental notes are further disclosed.

(Supplementary Note 1)

The accommodation management system according to Supplementary Note 1 is an accommodation management system including: a first acquisition unit that obtains a face image of a visiting user who uses a check-in terminal installed at a visible position from a reception counter of an accommodation facility; an execution unit that identifies the visiting user on the basis of the face image of the visiting user and performs a check-in process of the visiting user; a second acquisition unit that obtains a face image of a specific user who uses services; and a permission unit that permits a use of the services when the check-in process is completed for the specific user who is identified on the basis of the face image of the specific user.

(Supplementary Note 2)

An accommodation management system according to Supplementary Note 2 is the accommodation management system according to Supplementary Note 1, wherein the execution unit obtains a pre-registration information about the visiting user identified, and performs the check-in process on the basis of the pre-registration information.

(Supplementary Note 3)

An accommodation management system according to Supplementary Note 3 is the accommodation management system according to Supplementary Note 1 or 2, wherein the accommodation management system further includes a registration unit that registers the face image of the visiting user who performs the check-in process, as a face image of a permitted user who is allowed to use services provided in the accommodation facility, and the permission unit permits the use of the services when the specific user is determined to be the permitted user by face authentication using the face image of the specific user and the face image of the permitted user.

(Supplementary Note 4)

An accommodation management system according to Supplementary Note 4 is the accommodation management system according to any one of Supplementary Notes 1 to 3, wherein the registration unit registers a face image of a traveling companion of the visiting user as a face image of a permitted user who is allowed to use services provided in the accommodation facility, in addition to the face image of the visiting user.

(Supplementary Note 5)

An accommodation management system according to Supplementary Note 5 is the accommodation management system according to any one of Supplementary Notes 1 to 4, wherein the registration unit registers a gender information about a gender of the permitted user, in addition to the face image of the permitted user, and the permission unit permits the use of the services when the specific user is determined to be a permitted user who is allowed to use services provided in the accommodation facility and the gender information of the permitted user meets use conditions of the services.

(Supplementary Note 6)

An accommodation management system according to Supplementary Note 6 is the accommodation management system according to any one of Supplementary Notes 1 to 5, wherein the accommodation management system further comprises an issuing unit that issues a card key to a user for whom the check-in process is performed, the permission unit permits the use of the services when the card key is authenticated, and the issuing unit limits a number of the card keys issued to be less than a number of people in a group for whom the check-in process is performed when the group includes a user who uses face authentication and a user who uses authentication by the card key.

(Supplementary Note 7)

An accommodation management system according to Supplementary Note 7 is the accommodation management system according to Supplementary Note 6, wherein the issuing unit limits the number of the card keys issued such that an upper limit of the number of the card keys issued is obtained by subtracting a number of users who use the face authentication from the number of people in the group.

(Supplementary Note 8)

An accommodation management apparatus according to Supplementary Note 8 is an accommodation management apparatus including: a visiting user image acquisition unit that obtains a face image of a visiting user who uses a check-in terminal installed at a visible position from a reception counter of an accommodation facility; an execution unit that identifies the visiting user on the basis of the face image of the visiting user and performs a check-in process of the visiting user; and a registration unit that registers the face image of the visiting user who performs the check-in process, as a face image of a permitted user who is allowed to use services provided in the accommodation facility.

(Supplementary Note 9)

An accommodation management apparatus according to Supplementary Note 9 is an accommodation management apparatus including: a permitted user image acquisition unit that obtains a face image of a visiting user who uses a check-in terminal installed at a visible position from a reception counter of an accommodation facility and a face image of a permitted user who is allowed to use services provided in the accommodation facility; a specific user image acquisition unit that obtains a face image of a specific user who uses the services; and a permission unit that permits a use of the services when the specific user is determined to be the permitted user by face authentication using the face image of the specified user and the face image of the permitted user.

(Supplementary Note 10)

An accommodation management method according to Supplementary Note 10 is an accommodation management method including: obtaining a face image of a visiting user who uses a check-in terminal installed at a visible position from a reception counter of an accommodation facility; identifying the visiting user on the basis of the face image of the visiting user and performing a check-in process of the visiting user; obtaining a face image of a specific user who uses services; and permitting a use of the services when the check-in process is completed for the specific user who is identified on the basis of the face image of the specific user.

(Supplementary Note 11)

A computer program product according to Supplementary Note 11 is a computer program product for allowing a computer to execute an accommodation management method including: obtaining a face image of a visiting user who uses a check-in terminal installed at a visible position from a reception counter of an accommodation facility; identifying the visiting user on the basis of the face image of the visiting user and performing a check-in process of the visiting user; obtaining a face image of a specific user who uses services; and permitting a use of the services when the check-in process is completed for the specific user who is identified on the basis of the face image of the specific user.

(Supplementary Note 12)

A non-transitory program recording medium according to Supplementary Note 12 is a non-transitory program recording medium on which a computer program product according to Supplementary Note 11 is recorded.

The present disclosure is not limited to the above described examples and is allowed to be changed, if desired, without departing from the essence or spirit of the disclosure which can be read from the claims and the entire specification. An accommodation management system, an accommodation management apparatus, an accommodation management method, and a non-transitory program recording medium, which involve such changes, are also intended to be within the technical scope of the present disclosure.

To the extent permitted by law, this application is based upon and claims the benefit of priority from the prior Japanese Patent Application No. 2019-195194, filed on Oct. 28, 2019, all the disclosure of which is incorporated herein in its entirety by reference. Moreover, to the extent permitted by law, all the publications and articles described in the specification of this application are incorporated herein by reference.

The present disclosure may be embodied in other specific forms without departing from the spirit or essential characteristics thereof. The present example embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A facility management system comprising:

at least one memory storing one or more instructions; and at least one processor configured to execute the one or more instructions to:

obtain a first face image of a user using a camera of a check-in terminal at a facility;

identify the user by a first face authentication using the first face image of the user and a pre-stored image, and perform a check-in process of the user;

in response to the check-in process of the user being successful, send a first control signal to a display of the check-in terminal to display to the user, information including a question to select a type of authentication from among a second face authentication and a card key authentication;

obtain a user selection in response to the question displayed;

obtain a second face image of a user who uses services of a predetermined equipment at the facility;

send a second control signal to a barrier to control the barrier to permit use of the services based on the selected type of authentication by the user;

determine a first number of people in a group for whom the check-in process is performed; and send a third control signal to the check-in terminal to issue a card key for a second number of people determined by subtracting a third number of users who use the face authentication from the first number of people in the group, wherein based on the user selection being the second face authentication, perform the second face authentication using the first face image and the second face image, and based on the user selection being the card key authentication, performing the card key authentication using a key information.

2. The facility management system according to claim 1, wherein the at least one processor is further configured to issue the card key when the user selects to use the card key authentication.

3. The facility management system according to claim 2, wherein the at least one processor is further configured to:

determine the first number of people in the group for whom the check-in process is performed when the group includes a user who uses second face authentication and a user who uses the card key authentication; and send a signal to limit a number of the card keys issued to be less than the first number.

4. The facility management system according to claim 1, wherein the at least one processor is further configured to register the face image of the user who performed the check-in process as a face image of the permitted user who is allowed to use the services, when the second face authentication is selected to be used.

5. The facility management system according to claim 4, wherein the at least one processor is further configured to register a face image of a traveling companion of the user as a face image of the permitted user, in addition to the face image of the user.

6. The facility management system according to claim 1, wherein the predetermined equipment includes at least one of a guest room, each facility, a large public bath and a facility where alcohol is provided.

7. A facility management method comprising:

obtaining a first face image of a user using a camera of a check-in terminal at a facility;

identifying the user by a first face authentication using the first face image of the user and a pre-stored image, and perform a check-in process of the user;

in response to the check-in process of the user being successful, sending a first control signal to a display of the check-in terminal to display to the user, information including a question to select a type of authentication from among a second face authentication and a card key authentication;

obtaining a user selection in response to the question displayed;

obtaining a second face image of a user who uses services of a predetermined equipment at the facility;

sending a second control signal to a barrier to control the barrier to permit use of the services based on the selected type of authentication by the user;

determining a first number of people in a group for whom the check-in process is performed; and sending a third control signal to the check-in terminal to issue a card key for a second number of people determined by subtracting a third number of users who use the face authentication from the first number of people in the group, wherein based on the user selection being the second face authentication, perform the second face authentication using the first face image and the second face image, and based on the user selection being the card key authentication, performing the card key authentication using a key information.

8. A non-transitory recording medium on which a computer program that allows a computer to execute a facility management method is recorded, the facility management method comprising:

obtaining a first face image of a user using a camera of a check-in terminal at a facility;

identifying the user by a first face authentication using the first face image of the user and a pre-stored image, and perform a check-in process of the user;

in response to the check-in process of the user being successful, sending a first control signal to a display of the check-in terminal to display to the user, information including a question to select a type of authentication from among a second face authentication and a card key authentication;

obtaining a user selection in response to the question displayed;

obtaining a second face image of a user who uses services of a predetermined equipment at the facility;

sending a second control signal to a barrier to control the barrier to permit use of the services based on the selected type of authentication by the user;

determining a first number of people in a group for whom the check-in process is performed; and sending a third control signal to the check-in terminal to a card key for a second number of people determined by subtracting a third number of users who use the face authentication from the first number of people in the group, wherein based on the user selection being the second face authentication, perform the second face authentication using the first face image and the second face image, and based on the user selection being the card key authentication, performing the card key authentication using a key information.

* * * * *